US009401926B1

(12) United States Patent
Dubow et al.

(10) Patent No.: US 9,401,926 B1
(45) Date of Patent: Jul. 26, 2016

(54) SYSTEM AND METHOD FOR IMPLEMENTATION OF CYBER SECURITY

(71) Applicant: Fulcrum IT Services, LLC, Centerville, VA (US)

(72) Inventors: Joel Dubow, Annandale, VA (US); Douglas Meyer, Woodbridge, VA (US)

(73) Assignee: Fulcrum IP Services, LLC, Centreville, VA (US)

( * ) Notice: Subject to any disclaimer, the term of this patent is extended or adjusted under 35 U.S.C. 154(b) by 0 days.

(21) Appl. No.: 14/251,623

(22) Filed: Apr. 13, 2014

Related U.S. Application Data

(60) Provisional application No. 61/898,412, filed on Oct. 31, 2013.

(51) Int. Cl.
G08B 23/00 (2006.01)
H04L 29/06 (2006.01)

(52) U.S. Cl.
CPC ................................ *H04L 63/1433* (2013.01)

(58) Field of Classification Search
USPC .......................................................... 726/25
See application file for complete search history.

(56) References Cited

U.S. PATENT DOCUMENTS

| | | | |
|---|---|---|---|
| 8,516,576 B2* | 8/2013 | Figlin et al. ...................... | 726/22 |
| 8,677,479 B2* | 3/2014 | Neystadt et al. ................ | 726/22 |
| 2006/0070129 A1* | 3/2006 | Sobel et al. ...................... | 726/23 |
| 2008/0010225 A1* | 1/2008 | Gonsalves et al. .............. | 706/11 |
| 2011/0231936 A1* | 9/2011 | Williams et al. ................. | 726/25 |
| 2013/0055404 A1* | 2/2013 | Khalili ............................ | 726/25 |
| 2013/0074143 A1* | 3/2013 | Bu et al. ............................ | 726/1 |
| 2014/0157405 A1* | 6/2014 | Joll et al. ......................... | 726/22 |

* cited by examiner

*Primary Examiner* — Amare F Tabor

(57) ABSTRACT

The present invention provides a system and method designed to continually monitor and evaluate an IT system. More specifically, the present invention teaches a system and method which continually monitors and evaluates the software, networks and devices of an IT system while providing reports and analysis for identified risks. Further, the present invention teaches a system and method which provides analysis and reports regarding the value and costs of identified risks.

1 Claim, 5 Drawing Sheets

SYSTEM AND METHOD FOR IMPLEMENTATION OF CYBER SECURITY

PRIORITY CLAIM

The present invention claims priority to U.S. Provisional Application No. 61/898,412 filed Oct. 31, 2013.

BACKGROUND AND FIELD OF THE PRESENT INVENTION

1. Field of the Present Invention

The present invention relates generally to a system and method for measuring and quantifying risk within a monitored system. More specifically, the present invention relates to a system, method and apparatus for quantifying risk within a monitored information technology ("IT") system and for providing feedback to improve security risk management measures within the monitored system.

2. Background of the Invention

The main threats to individuals and organizations using information technology are losses stemming from security breaches. These losses include loss of confidentiality, integrity and availability of information technology resources. The financial costs of these losses are difficult to over-estimate as systems, companies and even countries grow increasing dependent on their IT and computer systems (collectively referred to herein as "IT systems").

DESCRIPTION OF RELATED ART

Because of the extreme importance of cyber security, there has been a great deal written on the subject including: Aven, T., *Quantitative Risk Assessment: The Scientific Platform* (2011); Cox, L., *Risk Analysis of Complex and Uncertain Systems* (2009); Denuit, M., Actuarial Theory of Dependent Risks (2004); Gama, J. *Knowledge Discovery from Data Streams* (2010); Gori, U. *Modelling Cyber Security, Approaches*, Methodology, Strategies. (2009); Last, M., *Data Mining in Time Series Databases* (2004); Liggins, M., *Handbook of Multi-Sensor Data Fusion*. (2009); Ou, X. S., *Quantitative Security Risk Assessment of Enterprise Networks* (2012); Rajaraman, A. *Mining of Massive Data Sets*. (2011); and Retherford, R., *Statistical Models for Causal Analysis* (1993); Rubino, G., *Rare Event Simulation using Monte Carlo Methods* (2009); Shabazian, E. R., *Data Fusion for Situation Monitoring, Incident Detection, Alert and Response Management* (2005); and Tsai, J. *Machine Learning in Cyber Trust* (2009).

Though voluminous, the background prior art fails to teach or suggest an effective system for monitoring, quantifying and allocating risk within a monitored IT system. Because of this, the present day systems continue to create great risk and uncertainty across the entire spectrum of IT enterprises.

SUMMARY OF THE PRESENT INVENTION

The present invention overcomes the limitations of the prior art by providing a system designed to continually monitor and evaluate an entire enterprise's IT system. More specifically, the present invention teaches a system and method which continually monitors and evaluates the security data for software, networks and devices of an IT system while providing reports and analysis to quantify and allocate identified risks. Further, the present invention teaches a system which provides analysis and reports regarding the quantified value and costs of identified risks.

The accompanying drawings, which are incorporated in and constitute part of the specification, illustrate various embodiments of the present invention and together with the description, serve to explain the principles of the present invention.

DESCRIPTION OF THE PREFERRED EMBODIMENTS

Figure 1:
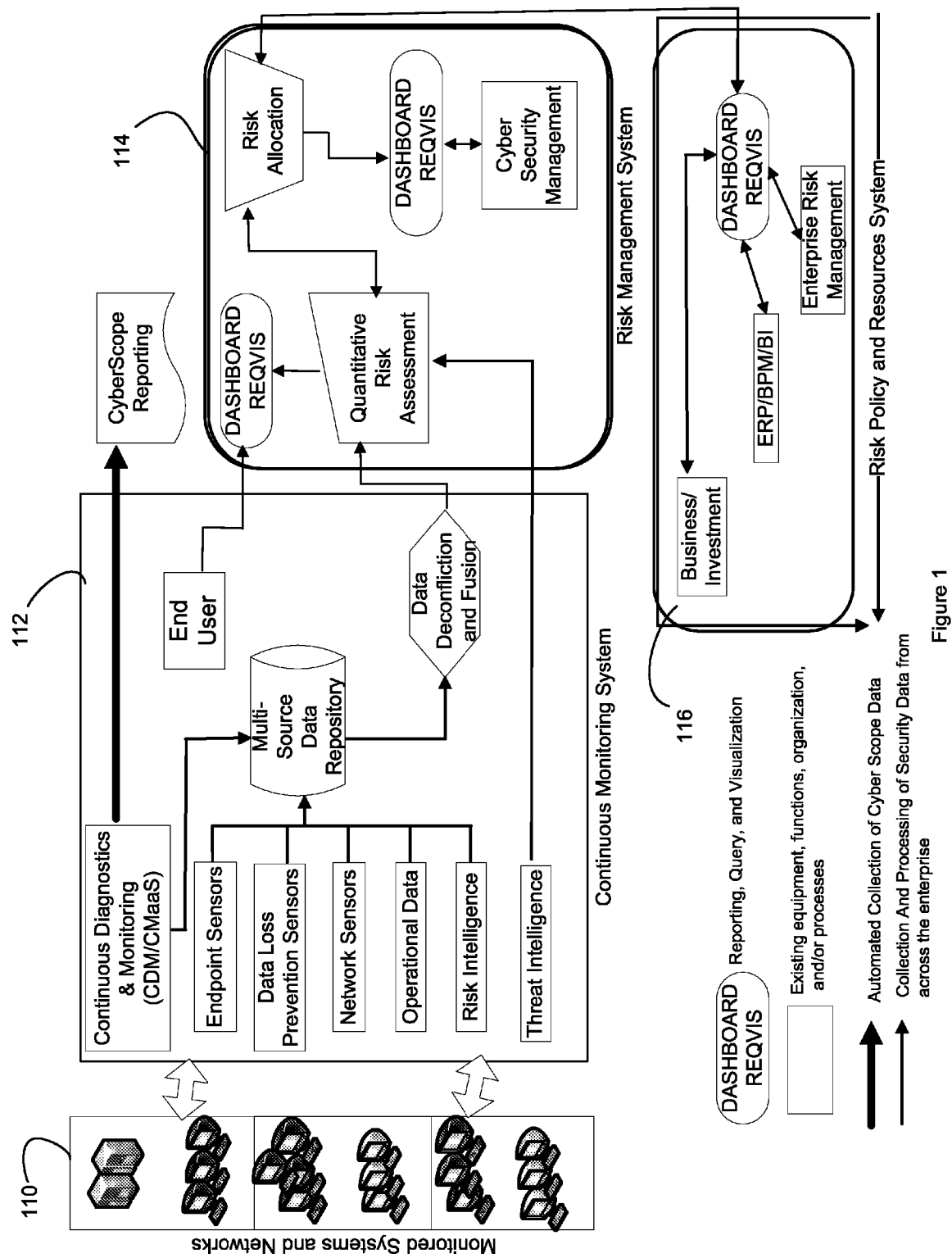
FIG. 1 shows a block diagram of an IT monitoring system in accordance with a preferred embodiment of the present invention.

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

The terms "program," "computer program," "software application," and the like as used herein, are defined as a sequence of instructions designed for execution on a computer system or within an IT system. A program, computer program, or software application may include a subroutine, a function, a procedure, an object implementation, an executable application, an applet, a servlet, a source code, an object code, a shared library, a dynamic load library and/or other sequence of instructions designed for execution on a computer system. The terms "processor," "module," "system," "subsystem," "domain," "engine," and the like as used herein are defined as a computer processor, set of processors, collection of computer elements or computer code for executing instructions within a computer or within a computer system. A "database," "data repository," "data store" and the like, as used herein, include many different types of computer readable media that allow a computer to store, organize and manage data on a data storage means. Such data storage means can include, for example, non-volatile memory, such as ROM, Flash memory, battery backed-up RAM, Disk drive memory, CD-ROM, DVD, and other permanent storage media. However, even volatile storage such a RAM, buffers, cache memory, and network circuits are contemplated to serve as such data storage means according to different embodiments of the present invention.

With reference now to FIG. 1, a block diagram showing an overview of a first preferred embodiment of the present invention will now be discussed. As shown in FIG. 1, the present invention shall be discussed with regards to the monitoring of a network 110. As shown, the exemplary monitoring system of the present invention preferably includes a continuous monitoring system 112, a risk management system 114 and a risk policy system 116. Each of these systems of the present invention shall each be discussed in detail below with reference to FIGS. 2-4.

Figure 2:
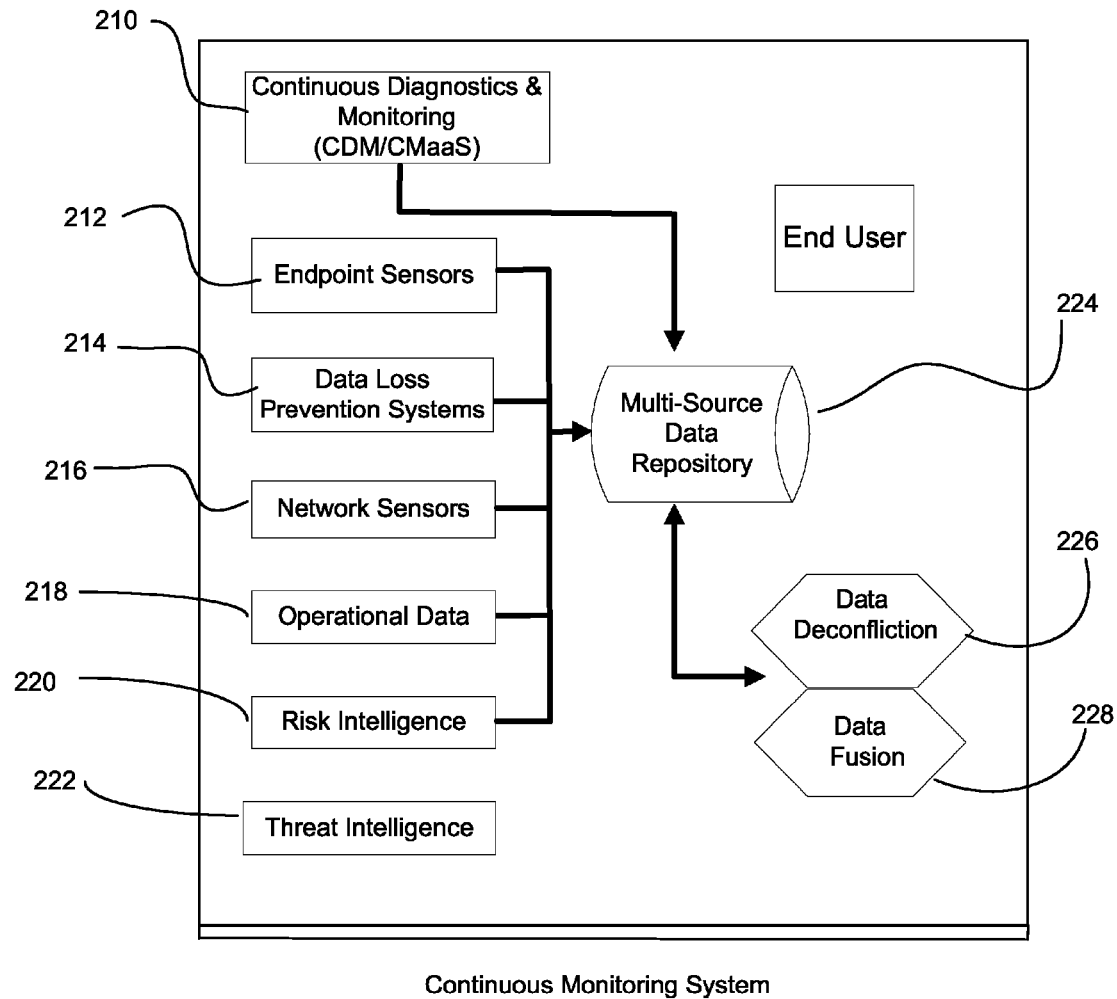
FIG. 2 shows a block diagram of a continuous monitoring system in accordance with a preferred embodiment of the present invention.

With reference now to FIG. 2, an exemplary continuous monitoring system 112 of the present invention shall now be discussed. As shown in FIG. 2, the continuous monitoring system 112 preferably includes data sources such as the DHS Continuous Diagnostics and Monitoring suite (CDM/CMAAS) 210 and endpoint sensors 212 that obtain data from the computer devices that comprise the IT system of a monitored organization. Preferably, this data collection includes data from mobile devices, enterprise devices such as servers and printers, workstations and network devices such as routers. Additionally, further organizational data may be collected and made available to the system via the data loss prevention system 214. Preferably, data provided by the data loss prevention system 214 may include data related to operational, compliance and business continuity. Further, operational data 218 may also be provided separately where it is generated outside of the data monitored by the data loss prevention system 214.

As further shown in FIG. 2, data from additional networking sensors 216 may be used to provide further data related to network communications such as intrusion detection, intrusion prevention, and internet traffic monitoring. Further, data on new and prior risks obtained from external sources may also be included and modeled in the risk intelligence system 220. Additionally, emerging sources of threats may be delivered and modeled via the threat intelligence system 222. These provide the inputs to the present invention.

According to a preferred embodiment of the present invention, each of the monitored data sources is preferably collected and stored in a data repository 224. As data from each of the sources 210-222 will usually differ in format and data structure, the data is preferably transformed into a common format such as SCAP (Security Content Automation Protocol), STIX or other XML format so that the data can be subsequently mined, modeled and interpreted. According to a preferred embodiment, the data repository 224 preferably provides a common schema and archive for all security sensor data in the system as well as for externally produced forensic and intelligence reports. While a common format such as Security Content Automation Protocol (SCAP) is desirable and used to the extent possible, the output of non-SCAP complaint tools may also be used along with any required input transformations, extended data dictionaries, and database designs that encompass all inputs. According to a preferred embodiment, the database and its design should be chosen to facilitate the subsequent determination of relationships between the multi-dimensional raw or partially processed security outputs.

Since the data that is stored on the data repository 224 is obtained from a variety of tools that have proprietary or unique algorithms for detecting cyber security issues, there is a high probability that the same cyber event will be identified and labeled differently by two or more tools. This conflicting identification will need to be resolved by a combination of data deconfliction methodologies such as rule based and machine learning tools which are provided via the data deconflicting engine 226.

Once deconflicted, the data fusion engine 228 preferably extracts data from the data store 224 and derives a common operating picture based on deconflicted data. Preferably, data fusion is accomplished using a number of technologies which may include Dempster/Schaeffer, Bayesian classifiers, neural nets, parallel coordinates, genetic algorithms, AI techniques and other classification schemes. The best embodiment of data fusion will depend upon the structure of the cyber data and the depth of prior knowledge and data available for use in the system. According to a preferred embodiment of the present invention, the data fusion engine 228 preferably takes the multi-source and multi-dimensional cyber monitoring data and combines it, using a combination of hard and soft interpretation methodologies to achieve inferences that are more actionable and tailored than could be achieved manually or by disparate sources alone.

The product of the data fusion system is an enterprise common operating picture which includes the threats, risks, vulnerabilities, and compliance posture of the IT system. As discussed further below, the collected, deconflicted and fused data may then be made available to operations staff, system owners and data owners in the daily management of the IT system. Preferably, the fused data identifies targets for remediation as well as needed actions on regulatory and service level agreement issues. Ideally, these data may also be used to track system operations and to respond to daily cyber events and any needed forensic investigations. The time records of these data are also useful for tracking security status trends. Ideally, the data fusion engine 228 will be configured to produce organizational cyber security data which is customized for the particular enterprise being monitored. These data, in turn, will serve as inputs to the quantitative risk estimation engine 330 for grouping, correlation, valuation, and reporting an enterprise risk profile for further processing as discussed further below.

Figure 3:
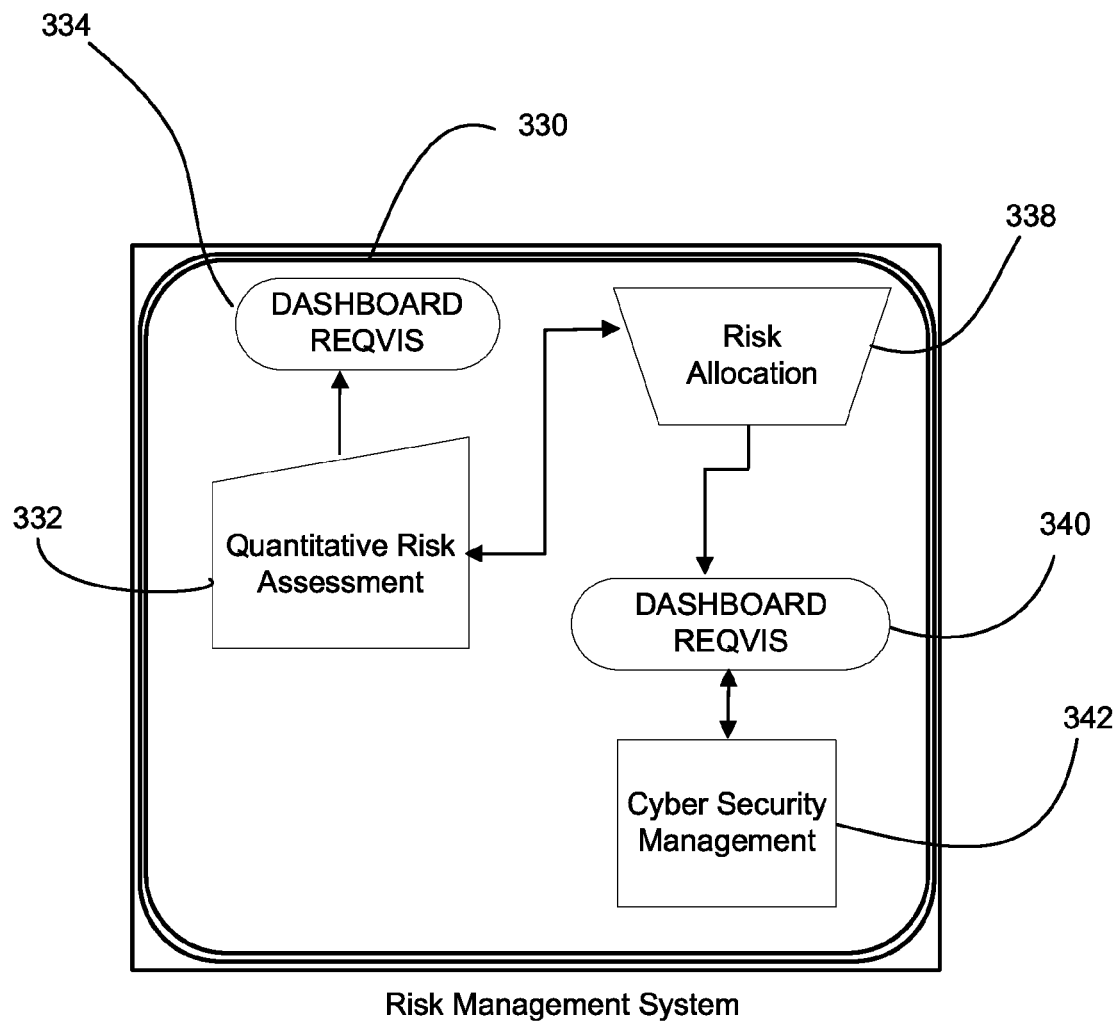
FIG. 3 shows a block diagram of a risk management system in accordance with a preferred embodiment of the present invention.

With reference now to FIG. 3, further aspects of the present invention with regarding to processing of the fused data will now be discussed. Referring now to FIG. 3, the risk management system 330 of the present invention is illustrated. In operation, the risk management system 330 is preferably configured to provide an interface through which the outputs of the data fusion system will be processed to produce a risk profile for the enterprise risk allocation, risk reduction, and risk investment processes. The components of this subsystem will preferably be chosen based on the quantity and type of data that needs to be analyzed. According to the present invention, the risk management system 330 preferably includes a number of risk estimation tools, services and methodologies to quantify individual risks, risk clusters, risk prioritization, risk mitigation options, and consequences using financial measures.

Preferably, the data received from the data fusion engine 228 is received within the risk management system 330 and processed via the quantitative risk assessment module 332. The quantitative risk assessment module 332 thereafter preferably transforms the fused data into an enumeration of all risks (also called potential loss events) for the organization. This enumeration is called the organizational risk portfolio. This portfolio preferably includes high impact/low probability (tail events) as well as lower impact/more probable events. The data for the risk portfolio and fused data for operational use is then preferably modeled and made available for presentation in a dashboard display that is focused on graphical and mathematical visualization of the data.

More specifically, the risk assessment module 332 preferably processes the risk profile data, including correlated and low probability/high impact risks, to the risk allocation module 338 that produces a risk allocation distributed amongst the enterprise and the IT enclave, Business Line, IT System, and other organizational categories. Preferably, the risk allocation system will also identify localized risks, risks shared between information assets, correlated risks and common enterprise wide risks. Further, this risk is then preferably partitioned into accepted risk, unaccepted risk that can be remediated with resources available and risks that will require resource pooling or new resources. The risk profile may then be optimized to minimize total and catastrophic loss based on business objectives. According to a preferred embodiment, the system preferably uses Monte Carlo or other actuarial modeling methodologies to recommend risk management based on organizationally derived criteria. Further, the risk management methods preferably include options for accepting an identified risk, mitigating the risk or transferring the risk to third parties. The costs of risk management are preferably distributed amongst the organizational units based on the quantitative distribution of risk to sources of risks. The data outputs of this step are preferably made available for presentation to management staff 342 via the dashboard REQVIS system 340.

According to a further preferred embodiment of the present invention, the REQVIS subsystem 340 preferably provides an interface through which data generated by the present invention is transformed into predefined or user selectable visual representations. Ideally, the REQVIS subsystem shall have the capability to transform and represent data in a variety of visual formats, both static and time varying. The system preferably utilizes a variety of templates including dashboards, graphs and multi-dimensional representations such as parallel coordinates. According to a further preferred embodiment, the REQVIS subsystem preferably processes requests by extracting data from the database 224 or other subsystems, transforming it and displaying it through the requester's web browser. For example, data outputs from the risk allocation subsystem 338 may be provided and made available through the REQVIS system 340.

Figure 4:
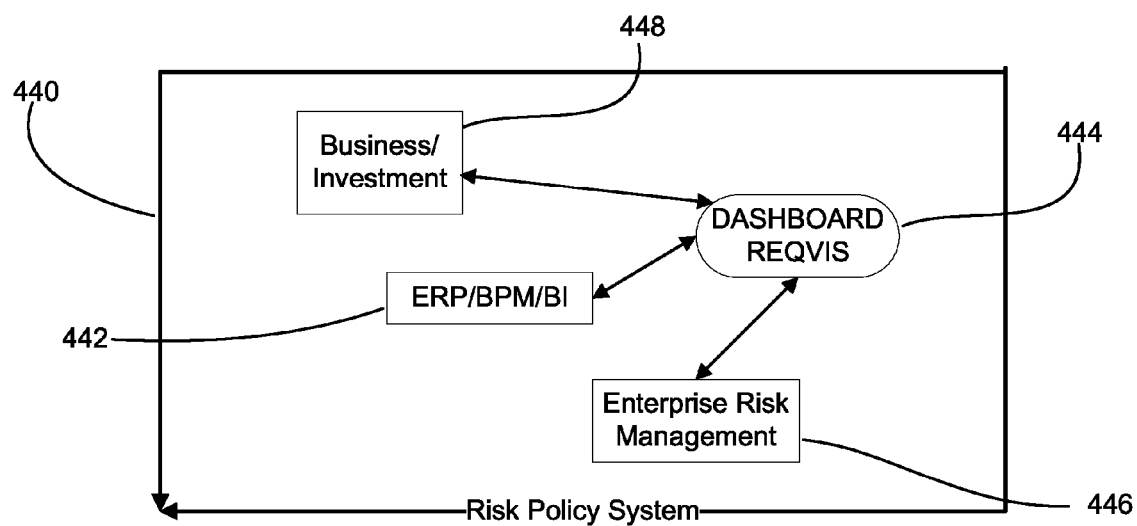
FIG. 4 shows a block diagram of a risk policy system of the present invention in accordance with a preferred embodiment of the present invention.

Referring now to FIG. 4, the data processed by the risk management system 330 as detailed above, is preferably provided to and further analyzed by the risk policy system 440. Within the risk policy system 440, the analyzed data may be provided to senior level management to incorporate into ongoing business processes. In operation, this data is preferably provided via the dashboard REQVIS system 444. According to one aspect of the present invention, the REQVIS system 444 may provide a scorecard, text and other management dashboard information to three groups of users: Enterprise Risk Management 446, Enterprise Resource/Business Process/Business Intelligence management 442 and Business Investment Managers 448. At this phase, the valuation of risk in dollars preferably provides its highest value since the valuation can be readily integrated with the costs of other risk management activities, with ongoing business operations resources expenditures and allocations, and with proposed investments that have an IT component. Preferably, the risk dashboard will permit risk estimates for new investments based on templates and models for investments.

Figure 5:
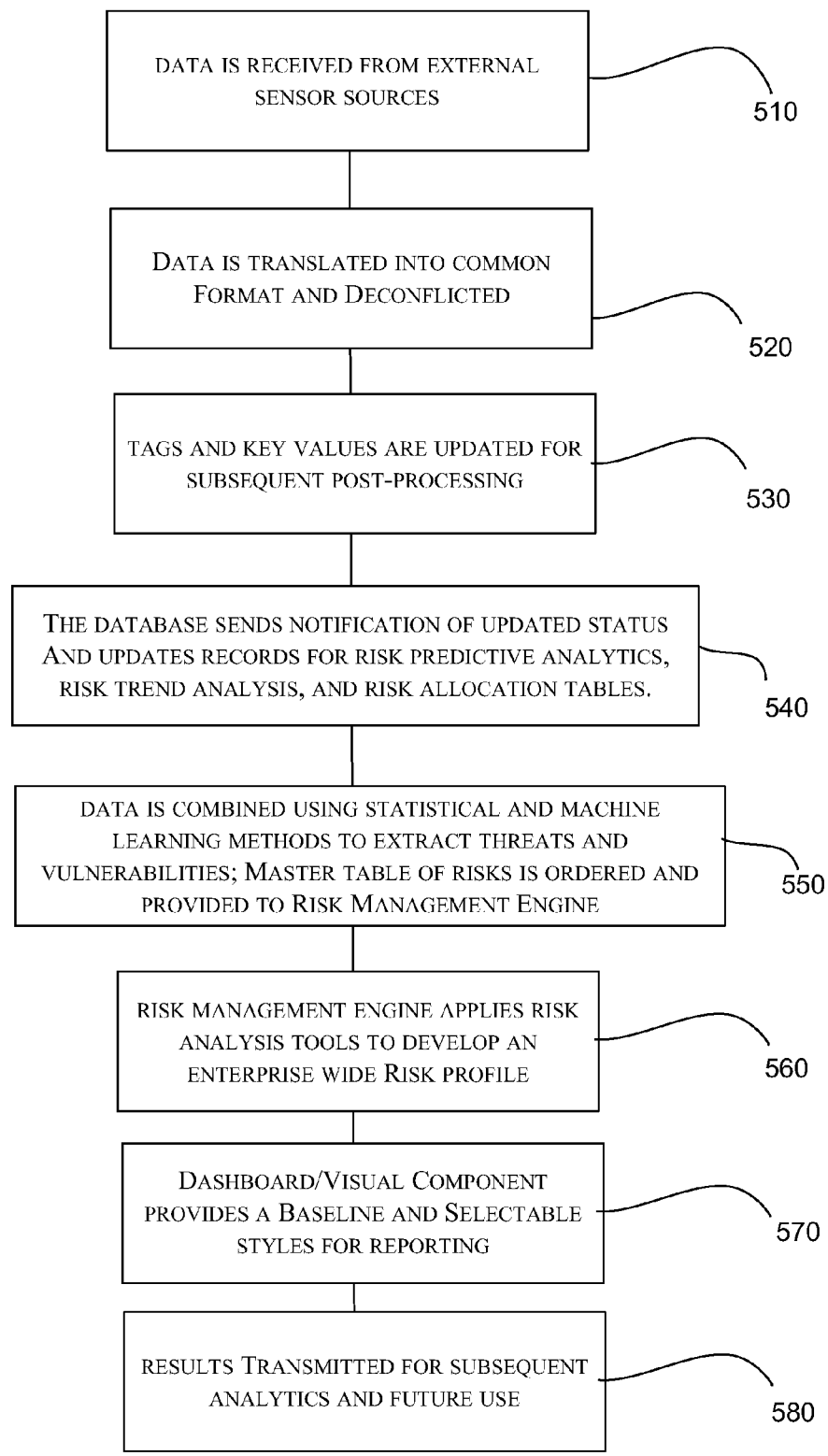
FIG. 5 shows a block diagram illustrating an exemplary method in accordance with a preferred embodiment of the present invention.

With reference now to the FIG. 5, an operational description of the present invention will now be provided. At an initial step 510, data is received from external sensor sources. As discussed above, the sources may preferably include end point, network and data loss prevention sensors as well as other tools described with respect to FIG. 2 above. Once received, the data from the sensors is preferably distributed to appropriate nodes, along with metadata tags identifying the data records and translated into a common format for storage 520. With this step, the database system preferably scans the data for conflicting values that need to be resolved and recommends resolution based on rules, consistency checks with other data, machine learning algorithms, and enterprise forensic patterns. After de-confliction, tags and key values are updated for subsequent post-processing 530.

Thereafter, at a next step 540, the database preferably sends notification of the updated status for processing via the post processing risk analysis tools as well as updating the forensic archival records for risk predictive analytics, risk trend analysis, and risk allocation tables. At a next step 550, data is preferably combined using a range of statistical and machine learning methods to extract threats, vulnerabilities and anomalies for remediation and establishing a common operating picture for cyber operations. Preferably, fused data are combined with forensic and time series results to provide context and constraints on data fusion operations. Still further, the findings are preferably grouped by security category, severity, location and other user-defined queries and categories. Further, it is preferred that fused data is sent to management personnel including: events, incidents, plan of action and milestones (POA&M) status, vulnerability types, and locations of cyber-attacks, endpoint status, and common operating picture.

At step 560, the risk management system preferably applies risk analysis tools to develop an enterprise wide set of IT security risks. Further within this step, the system preferably analyzes and categorizes fused risk data using filtering and ranking algorithms to produce a risk profile. Preferably, the total and categorized risks and cost of mitigations are part of the output report for inclusion in the reported profile. At step 570, the risk allocation is preferably transmitted to the visualization component (REQVIS) for reporting. Further, at step 580, upon completion of risk allocation reporting, the system preferably transmits its results to a data repository for subsequent analytics and future use.

While the above descriptions regarding the present invention contains much specificity, these should not be construed as limitations on the scope, but rather as examples. Further, while particular embodiments of the invention have been described, it will be understood that the invention disclosed is not limited thereto, since modifications may be made by those skilled in the art, particularly in light of the foregoing teachings. It is, therefore, contemplated by the appended claims to cover any such modifications that incorporate those features or these improvements which embody the spirit and scope of the present invention.

What is claimed is:

1. A method for monitoring and evaluating vulnerabilities and risks associated with an IT system of an enterprise, the method comprising:
   receiving data from a continuous monitoring system, wherein the continuous monitoring system is comprised a plurality of sensors that derive data from devices within the IT system, wherein the monitored devices include mobile devices, computing devices and network devices within the monitored IT system, further wherein the plurality of sensors are comprised of end point sensors, network sensors, and data loss prevention sensors;
   adding meta-tags to the received data;
   translating the received data after the addition of meta-tags;
   deconflicting the received data, wherein the data is deconflicted between data received by different sensors with the monitored IT system; further wherein the data is deconflicted between data received from different devices within the IT system;
   translating the deconflicted and meta-tagged data into a common format for storage;
   updating meta-tags and selected values for subsequent post-processing;
   sending notification of the updated status and updating records for the production of risk predictive analytics, risk trend analysis, and risk allocation tables;

combining data using statistical and machine learning methods to extract threats and vulnerabilities;

creating a master table of risks;

applying risk analysis tools to the master table of risks to develop an enterprise wide risk profile; wherein the master table of risks is grouped by security category, severity and location; further wherein the step of applying risk analysis tools to the master table of risks includes analyzing and categorizing risk data so that the total and categorized risks and cost of mitigations are part of the risk profile; wherein the risk profile includes loss probabilities and remediation cost estimates; wherein the categorized risks and cost of mitigations are allocated among endpoints and organizational entities in the enterprise;

providing a visual presentation component for presenting analysis of the risk profile;

transmitting the security profile results to a database;

extracting data from the database;

analyzing the extracted data to identify threats, risks and the compliance posture of the monitored IT system, wherein the extracted data is combined with forensic and time series results;

producing a listing of all IT risks for the monitored system; and applying a valuation to the identified IT risks for the monitored system, wherein the valuation is generated by integrating the listing of all IT risks with data representing business operations resources expenditures and allocations.

* * * * *